US00RE44506E

(19) United States
(12) Reissued Patent
Nip et al.

(10) Patent Number: US RE44,506 E
(45) Date of Reissued Patent: Sep. 24, 2013

(54) ROLLED PRODUCT DISPENSER

(75) Inventors: Jason Nip, Toronto (CA); Paul Rowan, Toronto (CA)

(73) Assignee: Umbra LLC, Buffalo, NY (US)

(21) Appl. No.: 12/908,614

(22) Filed: Oct. 20, 2010

Related U.S. Patent Documents

Reissue of:
(64) Patent No.: 7,438,256
Issued: Oct. 21, 2008
Appl. No.: 11/370,426
Filed: Mar. 8, 2006

(51) Int. Cl.
*B65H 75/18* (2006.01)

(52) U.S. Cl.
USPC ..... 242/597.7; 242/599.4

(58) Field of Classification Search
USPC ..... 242/597, 597.7, 597.8, 599.3, 599.4, 242/422.4, 422.5
See application file for complete search history.

(56) References Cited

U.S. PATENT DOCUMENTS

| | | | | |
|---|---|---|---|---|
| 2,073,429 | A | | 3/1937 | Spicher |
| 2,215,053 | A | | 9/1940 | Reese |
| 2,370,821 | A | | 3/1945 | Stott |
| 2,419,798 | A | | 4/1947 | Stone |
| 2,515,990 | A | | 7/1950 | Dantzler |
| 2,562,923 | A | * | 8/1951 | Kolivoski ..... 242/597.7 |
| 2,699,903 | A | | 1/1955 | Montgomery |
| 2,707,595 | A | | 5/1955 | Brown |
| 3,140,059 | A | | 7/1964 | Lusebrink |
| 3,292,874 | A | | 12/1966 | Tinkham |
| 3,312,410 | A | | 4/1967 | Strothmann |
| 3,612,423 | A | | 10/1971 | Bahnsen |
| 3,613,988 | A | | 10/1971 | Tapp et al. |
| 3,620,465 | A | | 11/1971 | Wyatt et al. |
| 3,770,221 | A | | 11/1973 | Stern |
| D229,775 | S | | 1/1974 | Carroll |
| 3,788,573 | A | | 1/1974 | Thomson et al. |
| 4,030,676 | A | | 6/1977 | Bardsley |
| 4,239,163 | A | | 12/1980 | Christian |
| 4,248,391 | A | | 2/1981 | Ness |
| 4,248,392 | A | | 2/1981 | Parry |
| 4,273,299 | A | | 6/1981 | Ness |
| D260,061 | S | | 8/1981 | Smith |
| 4,447,015 | A | | 5/1984 | Peterson |
| 4,487,376 | A | | 12/1984 | Compton |
| 4,535,951 | A | | 8/1985 | Riemenschneider, III |
| D283,095 | S | | 3/1986 | Compton |
| 4,720,053 | A | * | 1/1988 | Vance ..... 242/597.7 |
| 4,738,385 | A | | 4/1988 | Bell |
| 4,762,288 | A | | 8/1988 | Eckels |
| D298,597 | S | | 11/1988 | Bell |
| 4,878,631 | A | | 11/1989 | Tanovici |

(Continued)

FOREIGN PATENT DOCUMENTS

| | | |
|---|---|---|
| DE | 3613988 | 9/1987 |

*Primary Examiner* — William A Rivera
(74) *Attorney, Agent, or Firm* — Simpson & Simpson, PLLC

(57) ABSTRACT

The present invention broadly comprises an apparatus for holding and dispensing rolled products comprising a rigid linear core with a spindle attached to the exterior of the rigid linear core with at least one fin fixedly attached to the spindle. The fins are attached parallel to the spindle, are constructed of an elastomeric material, and extend outwardly and radially from the spindle. Removably attached to the rigid linear core is a head. Also, a base is fixedly attached to the rigid linear core distal to the head. Alternatively, the base can be replaced by a bracket that is capable of being attached to vertical and horizontal surfaces.

36 Claims, 3 Drawing Sheets

(56) References Cited

U.S. PATENT DOCUMENTS

| | | | | |
|---|---|---|---|---|
| 5,125,586 | A | | 6/1992 | Whitethorn |
| 5,167,377 | A | | 12/1992 | Chalmers |
| 5,170,956 | A | | 12/1992 | McTaggart |
| 5,297,750 | A | | 3/1994 | Hunt |
| 5,415,357 | A | | 5/1995 | Smith, Jr. |
| 5,451,013 | A | | 9/1995 | Schutz |
| 5,577,686 | A | | 11/1996 | Moody |
| 5,605,304 | A | | 2/1997 | Ahern, Jr. |
| 5,626,309 | A | * | 5/1997 | Morgan |
| 5,938,142 | A | | 8/1999 | Halperin |
| 6,267,316 | B1 | | 7/2001 | Cross |
| 6,357,687 | B1 | | 3/2002 | Liu |
| 6,450,439 | B1 | | 9/2002 | van Rees |
| 6,467,717 | B1 | | 10/2002 | Pedicano et al. |
| 6,478,246 | B2 | | 11/2002 | Fahringer |
| D477,730 | S | | 7/2003 | Hoernig |
| D479,072 | S | | 9/2003 | Duncan et al. |
| 6,619,582 | B1 | | 9/2003 | Jorgensen |
| D492,865 | S | | 7/2004 | Graves et al. |
| 6,776,368 | B1 | | 8/2004 | Duncan et al. |
| 6,793,097 | B2 | | 9/2004 | Kamenstein |
| D499,916 | S | | 12/2004 | Yang et al. |
| D500,934 | S | | 1/2005 | Petersen-Rutten |
| D507,716 | S | | 7/2005 | Snow et al. |
| 7,104,418 | B2 | | 9/2006 | Kamenstein |
| D532,228 | S | | 11/2006 | Snell |
| D550,488 | S | | 9/2007 | Nip et al. |
| 7,264,196 | B2 | | 9/2007 | Guay et al. |
| 7,290,733 | B2 | * | 11/2007 | Kamenstein et al. ..... 242/599.3 |
| 7,306,185 | B1 | * | 12/2007 | Miller ..... 242/597.8 |
| 7,438,256 | B2 | | 10/2008 | Nip et al. |
| 2002/0070308 | A1 | | 6/2002 | Fahringer |
| 2004/0124304 | A1 | | 7/2004 | Kamenstein |
| 2004/0159738 | A1 | | 8/2004 | Duncan et al. |
| 2005/0029392 | A1 | * | 2/2005 | Guay et al. ..... 242/597 |
| 2005/0056718 | A1 | | 3/2005 | Kamenstein |
| 2006/0219837 | A1 | | 10/2006 | Yang et al. |

* cited by examiner

ROLLED PRODUCT DISPENSER

Matter enclosed in heavy brackets [ ] appears in the original patent but forms no part of this reissue specification; matter printed in italics indicates the additions made by reissue.

FIELD OF THE INVENTION

This invention relates generally to a household product, more particularly to a rolled product dispenser having a linear core with at least one flexible fin fixedly attached that frictionally inhibits rotation of rolled products placed on the dispenser.

BACKGROUND OF THE INVENTION

Dispensers or holders for rolled products with braking mechanisms are known. For example, U.S. Pat. No. 3,788,573 discloses a dispenser for paper towels and toilet paper having a spindle with ribs. The dispenser has a yoke mechanism that prevents the rotation of the spindle by interacting with pins attached to the base of the spindle. A key feature in this holder is the implementation of the yoke mechanism which stops the rotation of the spindle when the yoke mechanism is positioned properly. An adjustment means is also incorporated into the holder that affects the friction applied to the rotating spindle and any attached paper product. These features require additional effort on the part of the user to operate the paper product roll dispenser. Complicated braking mechanisms and rotation control devices, such as those used by this type of holder lead to further manufacturing costs and time. Additionally, loading products onto and operating such a holder is complicated by these cumbersome features.

Other paper product holders (e.g., such as shown in U.S. Pat. Nos. 4,878,631 and 5,125,586) provide features that attempt to address the problem of preventing the uncontrolled rotation and unraveling of paper towel rolls. In both instances, the prevention of rotation of the paper product roll is accomplished by engaging the interior diameter of a paper product tube with spines that are either affixed to a tube, or are attached to a sleeve that rotates on the tube. Friction is exerted on the interior of the tube with the spines affixed or on the interior of a spiny sleeve. Force exerted on the tube is transferred from the tube spines to the interior of a paper product tube. As with other paper product holders the friction means requires multiple moving parts which increases manufacturing cost and time. Moreover, by introducing a friction adjustment means these holders have added complexity to the design, which the main factor that increases the costs of manufacture. These features also reduce the aesthetic appeal of the holder, and make the holder more difficult to operate.

What is needed, then, is a rolled product dispenser that can control the rotation of rolled product on a dispenser with a frictional element that requires no moving or complex parts. Additionally, what is lacking in previous incarnations of paper product holders is a design that accomplishes the task of preventing uncontrolled rotation of paper products without increasing load time. Secondarily, the apparatus should accomplish these tasks with a dispenser that is viable both vertically and horizontally.

SUMMARY OF THE INVENTION

The present invention broadly comprises an apparatus for holding and dispensing rolled products that comprises a rigid linear core with a spindle fixedly attached to the exterior of the rigid linear core with at least one fin fixedly attached to the spindle. Removably attached to the rigid linear core is a head. The fins are attached parallel to the spindle and are constructed of an elastomeric material, and extend outwardly and radially from the spindle. Preferably, a base is fixedly attached to the rigid linear core distal to the head. Alternatively, the base can be replaced by a bracket that is capable of being attached to vertical and horizontal surfaces.

In some aspects, the spindle of the rolled product dispenser has at least two fins disposed diametrically opposite to each other on the spindle. Alternatively, the spindle can have at least one fin that is attached parallel to the spindle and extends radially and outwardly from the spindle. The fin can be rigid at its base with increasing flexibility as the fin extends radially and outwardly from the spindle. In other embodiments the at least one fin is operatively arranged to constantly engage the interior of a rolled product tube when it is placed upon the spindle. The at least on fin can also be operatively arranged to impede the rotation of a rolled product tube when sheets of material are torn free from the roll. Preferably the base has a weighted portion or holes through which an attachment means can be used to secure the dispenser to a support surface. In some embodiments, the base has a cover portion that is placed over said weighted portion.

In other aspects, the rigid linear core has a threaded partial throughbore on one end and a threaded portion on an opposite end. The base can be attached to the rigid linear core by threading. The rigid linear core can extend from the center of said base, although in other embodiments the base can be offset. It is preferable that a flexible pad be attached to the base. In a preferred embodiment the head is greater in diameter than the interior diameter of a rolled product tube, but in some embodiments the head can be smaller than the interior diameter of a rolled product tube to facilitate easier loading and unloading. In some aspects, a mounting bracket is attached to the rigid linear core and the mounting bracket is arranged to be attached to a flat surface. The mounting bracket can be numerous shapes, but preferably it is L-shaped.

It is a general object of the invention is to provide a rolled product dispenser with a frictional means that can impede the rotation of tubes loaded on the dispenser.

It is another object of the invention is to provide a rolled product dispenser that can frictionally inhibit the rotation of paper towel rolls while still providing product loading times that are minimal.

It is further object of the invention is to provide a rolled product dispenser that is capable of being placed on horizontal surfaces or fixedly mounted on vertical or horizontal surfaces.

These and other objects, features, and advantages of the present invention will become readily apparent to those having ordinary skill in the art upon reading the following detailed description of the invention in view of the several drawings of the invention.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

Figure 1:
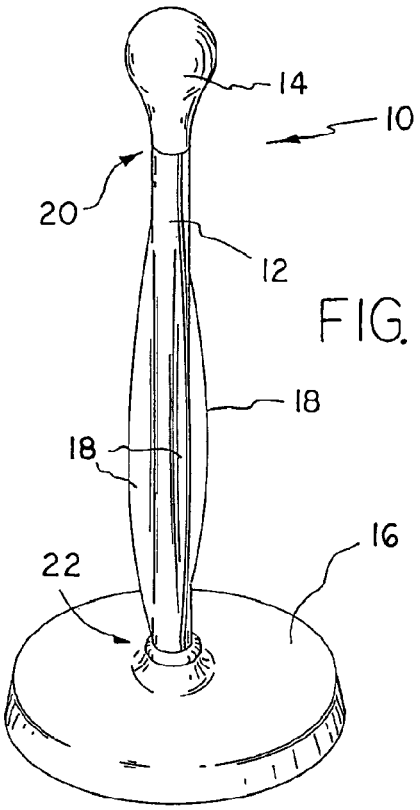
FIG. 1 is a perspective view of a dispenser of the present invention.
Figure 3:
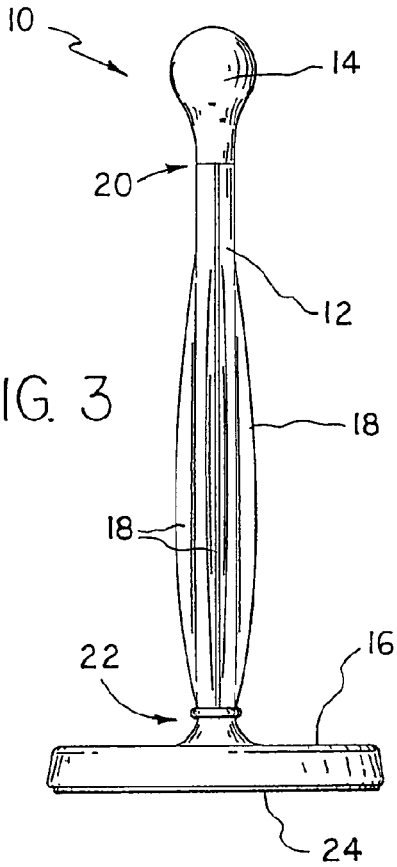
FIG. 3 is a front elevational view of the dispenser in FIG. 1.

FIG. 1 and FIG. 3 provide a perspective and a front elevational view, respectively, of dispenser 10 having spindle 12 with fins 18 attached. Fins 18 extend outwardly radially from spindle 12 and are operatively arranged to frictionally engage the interior diameter 30 of tube 28. As sheets are torn free from dispenser 10, fins 18 frictionally engage interior diameter 30 of tube 28, which prevents the uncontrolled unraveling or rotation of tube 28. Fins 18 are preferably constructed of an elastomeric material, such as rubber or a flexible polymer, which is capable of retarding the rotation of rolled products that are loaded on dispenser 10. It should be appreciated that dispenser 10 can be adapted to dispense numerous rolled product tube types. In this regard rolled products are any product that is formed in a tube shape that is designed to be dispensed by rotating. For example, in a preferred embodiment dispenser 10 can hold and dispense paper towels. Yet in other embodiments, dispenser 10 can hold and dispense rolled plastic wrap, toilet tissue, foil, or other various rolled materials. All of these various products listed, and their equivalents, fall within the category of rolled materials or products, and the subject invention can be adapted to be used with these products.

Figure 2:
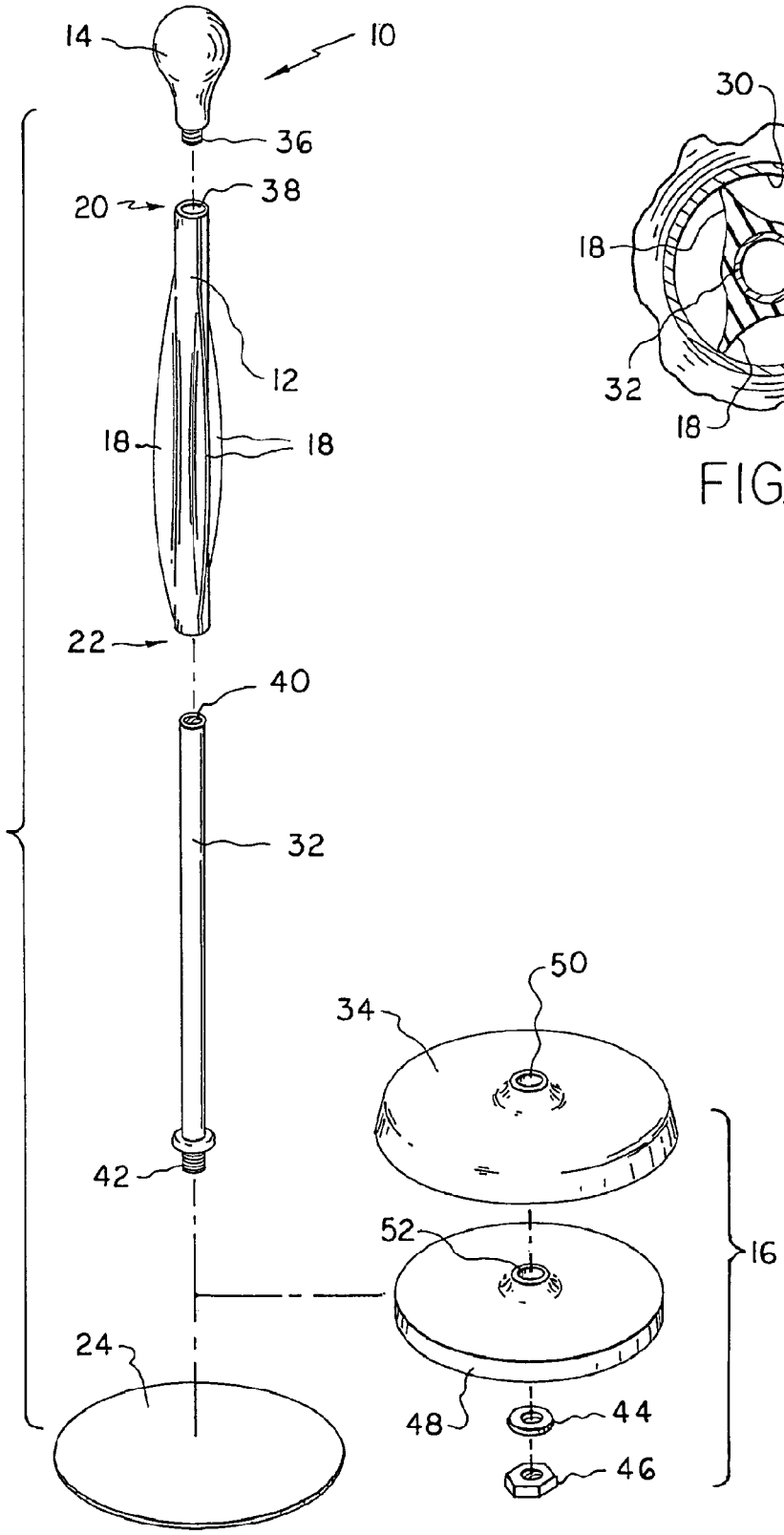
FIG. 2 is an exploded view of the dispenser in FIG. 1.

FIG. 2 is an exploded view of dispenser 10 showing the individual elements of the dispenser, some of which are unapparent when the dispenser is fully assembled. Case in point is linear core 32, which is encased within spindle 12, is one of those hidden elements. Linear core 32 provides the support needed to keep spindle 12 upright, and enables spindle 12 to support and hold rolled products. Linear core 32 can be a solid cylindrical tube, excluding the section reserved for partial throughbore 40, or a hollow cylindrical tube. To provide the necessary features it is advantageous that linear core 32 be constructed of a material that lends rigidity such as steel, aluminum, a metallic alloy, wood, rigid plastics or acrylics, or other materials known to one of ordinary skill in the art. Spindle 12 with fins 18 are fixedly attached to linear core 32 by essentially fusing the two elements using a suitable adhesive. Another alternative would be to use a linear core 32 with a diameter that is slightly smaller than the throughbore 38 of spindle 12, which would enable spindle 12 to be stretched over linear core 32 creating a tight fit that fixedly attaches spindle 12 to linear core 32. An adhesive can also be used to secure 12 to 32 in this instance as well.

Figure 4:
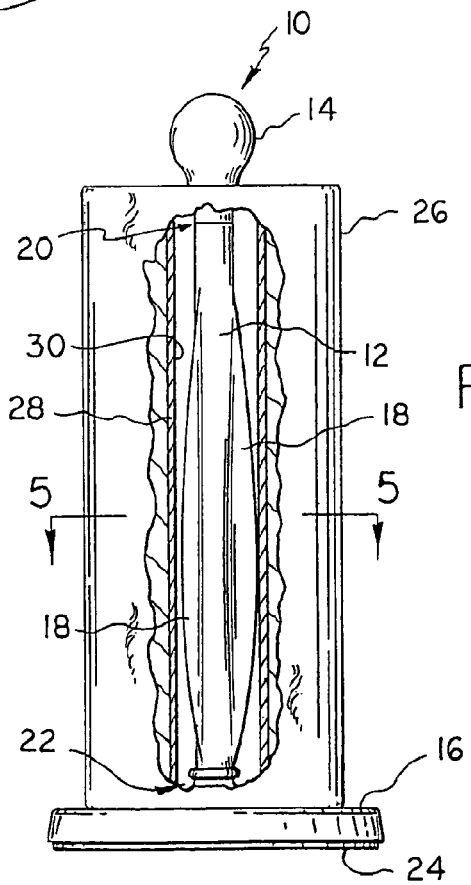
FIG. 4 is a front elevational view of the dispenser in FIG. 1, with a paper towel roll attached having a segment cut away to show the structure and function of the fins.

FIG. 4 is a front elevational view of dispenser 10 with paper towel roll 26 attached having a segment cut away to show the structure and function of fins 18. In a preferred embodiment of dispenser 10, at least one fin 18 is fixedly attached and parallel to spindle 12. Certain embodiments of dispenser 10 will have multiple fins 18 on spindle 12 that are diametrically opposed to each other. In a further configuration with multiple fins 18 there may be a single pair of fins, or multiple pairings. Although a single fin 18 would be sufficient to generate friction to impede the rotation of the tube attached, a pair of fins 18 will have greater restrictive friction, which may be beneficial in some applications. Attaching an even greater number of fins 18 to increase friction is another possible embodiment. The decision to add additional fins 18 will depend on the application. FIG. 1 shows the preferred arrangement with two pair of fins 18 fixedly attached to spindle 12 and diametrically opposed to each other.

Fins 18 can be fixedly attached to spindle 12 or they can be molded into the spindle in the manufacturing process in one step. When forming spindle 12 with fins 18 integral to spindle 12 in one step, manufacturing time and cost is greatly reduced. In an exemplary embodiment of dispenser 10, fins 18 are flexible. The flexibility of fins 18 increases as they extend outwardly from spindle 12. It is preferable that fins 18 have a generally triangular shape with a peak extending outwardly and radially from spindle 12. The flexibility of fins 18 aid in generating a impeding pressure on tubes that are loaded onto dispenser 10. The flexibility of fins 18 also help to modulate the pressure so that while rotation is impeded, the fins still enable the paper towel roll to rotate. Notwithstanding, fins 18 may extend a sufficient distance from spindle 12 to tightly engage interior diameter 30 of a tube 28, and thus impede rotation to a higher degree. It should be appreciated that whatever the product that is chosen to be held by dispenser 10 the extent that fins 18 extend from spindle 12 is adjustable to match the degree of friction that is desired.

As shown, fins 18 have a parabolic profile which generates the desired contact with the interior diameter 30 of tube 28. However, the profile of fins 18 can be other shapes such as rectangles, triangles, or half circles (not shown). It is also envisioned that the profile of fins 18 can be multiple parabolas, rectangles, triangles, or half circles (not shown).

In other embodiments, fins 18 may only contact interior diameter 30 of tube 28 when sheets of material are torn free from a roll. In such an embodiment fins 18 extend outwardly from spindle 12 a distance that is slightly less than the diameter of a standard paper towel tube, or other rolled material tube. Thus, in such an arrangement the tube may be placed and removed from spindle 12 without any force, and rotation of the tube is only slightly restricted by fins 18. Spindle 12 is preferably constructed of an elastomeric material that is similar to that used for fins 18, such as rubber or flexible polymers. Other materials known to one of ordinary skill in the art may be used as well.

Head 14 is removably attached to spindle 12 at spindle/head intersection 20 at the top of dispenser 10. In the embodiment shown in FIG. 1, head 14 is spherically shaped and is attached to the top of spindle 12, distal to base 16. Preferably head 14 is constructed of a metal, such as aluminum which can make the head durable and lightweight. Other suitable choices for construction materials include: other metals, metallic alloys, plastics, wood, acrylic, or any other similar material that would be known to one of ordinary skilled in the art. In an exemplary embodiment, head 14 has a diameter that is slightly less than the interior diameter of a standard paper towel tube. Constructing head 14 with a diameter that is slightly less than the interior diameter of a standard paper towel tube enables one to load and then remove empty tubes without removing head 12 from atop spindle 12. In other embodiments it may be advantageous that head 14 be sized larger than the diameter of the product roll loaded on dispenser 10. A dispenser with such a head will lose the advantage of quick and easy removal of rolls, but will add the capability of preventing rolls from falling off dispenser 10. A larger head 14 is particularly beneficial for applications such as with an alternative embodiment shown in FIG. 8. With a larger head rolls can only be removed by unthreading head 14 from spindle 12. Such an arrangement prevents the tube from being removed from dispenser 10, without first removing head 14. This is a particularly advantageous embodiment since the tube cannot be removed unintentionally as when one attempts to tear a sheet of material free from dispenser 10.

Base 16 is attached to spindle 12 at spindle/base intersection 22 at the bottom of dispenser 10. Base 16 is preferably constructed of multiple elements as will be described. One such base element is base pad 24, which in some aspects is made of a material that is elastomeric and is fixedly attached to base 16 using an adhesive known to those skilled in the art. Constructing base pad 24 of a material that is flexible such as rubber or foam rubber enables the base pad to acts as a buffer for the surface that dispenser 10 rests upon. Having base pad 24 constructed of elastomeric material also has the advantage that it frictionally grips the surface that dispenser 10 rests upon. This is advantageous since it prevents slipping of dispenser 10, which is particularly important when sheets of material are torn free from the dispenser.

Multiple elements formulate base 16. Base cover 34 is a face that effectively covers the internal elements of base 16. Base cover 34 provides an attractive fascia for base 16. Base cover 34 may be constructed of numerous different materials which include metals, metallic alloys, plastic, wood, or other materials known to one of ordinary skill in the art. Different finishes or colors can be applied to base cover 24 to provide flexibility for the consumer to adapt dispenser 10 to various decors. Through the center of base cover 34 is aperture 50 which can accept threaded portion 42 of linear core 32. Another useful element that may be incorporated into base 16 is weighted portion 48 with a centrally located aperture 52 that aligns with aperture 50. Both weighted portion 48 and base cover 34 may be attached to linear core 32 by inserting threaded portion 42 through 34 and 48 and then threading nut 46 onto 42. Optionally, a washer 44 can be used to prevent the loosening of nut 46. It should be appreciated that this attachment means is one of many possible attachment methods. Other alternatives include welding or adhesively fusing the base members to the linear core 32, or any means known to one skilled in the art for fixedly attaching.

FIG. 4 is a front elevational view of dispenser 10 with a paper towel roll 26 attached. Provided is a partial cut away of paper towel roll 26 to provide a view of the structure and function of fins 18. Interior diameter 30 of paper towel tube 28 is shown in contact with fins 18. This interaction causes the frictional force that impedes the uncontrolled unraveling or rotation of paper towel rolls when placed on dispenser 10. It should be appreciated that variations in the distance that fins 18 protrude from spindle 12 are variations that are within the spirit and scope of the invention. Dispenser 10 may have fins 18 with various dimensions depending on the degree of friction that is desired. In the embodiment shown, fins 18 are in contact with the interior diameter 30 of tube 28, but other configurations can have fins 18 with a slight gap between interior diameter 30 of tube 28. In such a configuration the interior diameter 30 of tube 28 comes in contact with fins 18 only when sheets are torn from the paper towel roll (or other rolled product). It should be appreciated that in some aspects, less than all the fins 18 are in contact with interior diameter 30 when products are not being dispensed from the dispenser. Friction produced when fins 18 rub the interior diameter 30 of tube 28 create enough restriction to facilitate easier product tearing from dispenser 10 and prevent the roll from spinning uncontrollably at the moment of tearing. It is advantageous that fins 18 protrude a sufficient distance from spindle 12 to contact interior diameter 30 of tube 28, if not constantly, at least enough to generate friction when material is torn free from dispenser 10.

Figure 5:
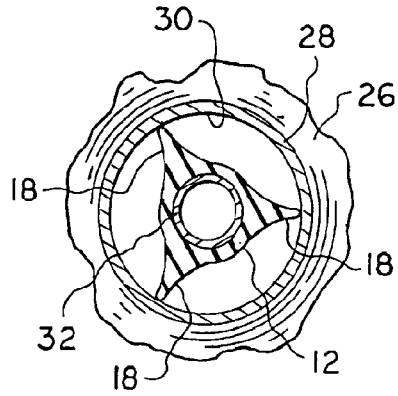
FIG. 5 is a cross section of the dispenser taken generally at line 5-5, as shown in FIG. 4.

FIG. 5 is a cross section taken generally at line 5-5, as shown in FIG. 4, of a top view of dispenser 10 that further demonstrates the structure and function of fins 18. Fins 18 are shown integral to linear core 32. As shown, spindle 12 is composed of linear core 32 with fins 18, where fins 18 are joined together and slid over linear core 32. The thin layer of material that connects fins 18 is preferably constructed of a material that is identical to the fin material, i.e., elastomeric material such as rubber or a flexible polymer. Fins 18 can be attached separately to a circular hollow spindle 12, or a hollow spindle 12 can be formed with fins 18 integral to spindle 12. As shown, fins 18 are in contact with interior diameter 30 of tube 28, but as mentioned earlier this is not the sole arrangement taught by this dispenser.

Figure 6:
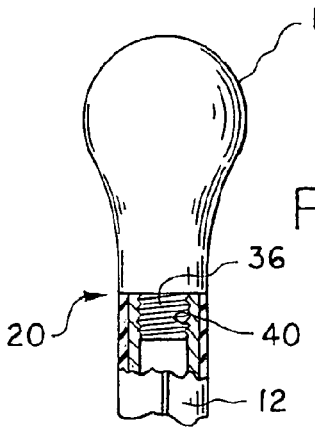
FIG. 6 is an enlarged view of the head of the dispenser in FIG. 1, with a segment cut away to show the threaded portion of the head.

FIG. 6 is an enlarged view of head 14 of dispenser 10 with a segment cut away to show threaded portion 36. Head 14 is threaded into internal spindle throughbore 40, which has an upper threaded portion that matches the thread of threaded portion 36. This threading occurs at intersection 20 at the top of spindle 12 and enables head 14 to be removably attached to linear core 32. It is preferable that head 14 be spherical shaped with a diameter that is slightly smaller than the interior diameter of the roll that is going to be mounted on dispenser 10. A head 14 of that size and shape will enable a user to load and remove products on dispenser 10 with relative ease. Although it is shown that head 14 is spherical shaped other shapes will function just as well.

Figure 7:
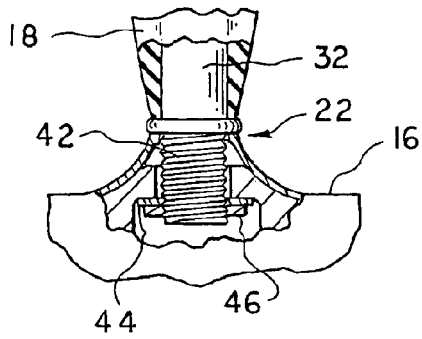
FIG. 7 is an enlarged view of the connection between the rigid linear core and the base of the dispenser as shown in FIG. 1.

FIG. 7 is an enlarged view of the intersection 22 between linear core 32 and base 16. Threaded portion 42 of linear core 32 is shown threaded into base nut 46. It is advantageous that washer 44 be placed between nut 46 and the recess in base 16 to prevent the loosening of the connection between base 16 and linear core 32. As discussed previously, the joining of base 16 to linear core 32 can be accomplished by numerous other means which can include welding, adhering with a suitable epoxy, or other equivalent means known to those of ordinary skill in the art.

Figure 8:
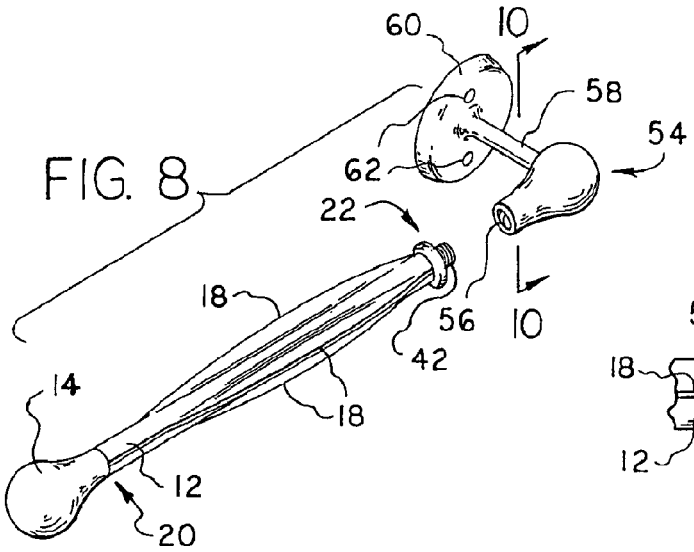
FIG. 8 is a perspective view of an alternative embodiment of the dispenser with the spindle and linear core removed.

FIG. 8 is a perspective view of an alternative embodiment of dispenser 10 having an upper portion that includes linear core 32, spindle 12, head 14 that is identical to the primary embodiment described above. This alternative embodiment of dispenser 10 enables the attachment of dispenser 10 to vertical surfaces as opposed to resting it solely on horizontal surfaces. In this alternative embodiment dispenser 10 is fixedly mountable to vertical or horizontal surfaces. An alternative embodiment of dispenser 10 replaces base 16 with mounting bracket 54. As shown, linear core 32, spindle 12 and head 14 has been unthreaded from mounting bracket 54. In FIG. 8, mounting bracket 54 has a main body portion that is a spherically shaped in a similar fashion as head 14. It should be understood that alteration of the shape of mounting bracket 54 will not affect function of the bracket, and are within the spirit and scope of the invention. The main spherical body portion is attached to stanchion 58 and stanchion 58 is attached to mounting bracket base 60. Mounting bracket 54 can be secured to a vertical or horizontal surface using screws, nails, or similar attachment means (not shown). Screws are inserted into apertures 62 of bracket base 60 and then screwed into the surface that bracket 54 is to be mounted to. To enable easier installation of this alternative embodiment of dispenser 10, linear core 32 can be unscrewed from mounting bracket 54 before attempting to mount an alternative embodiment of dispenser 10.

It is advantageous that mounting bracket 54 be cast as one unit, but it is also possible that the individual elements, i.e., spherical body portion, stanchion 58, and bracket base 60, of mounting bracket 54 can be formed separately and then fixedly attached together. Preferably, mounting bracket 54 is cast out of a lightweight metal, but it also likely that natural products, acrylics, polymers, or other metals can also be utilized.

Figure 9:
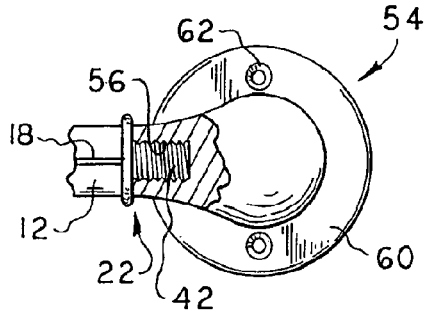
FIG. 9 is an enlarged top plan view of the mounting bracket of an alternative embodiment of the dispenser in FIG. 8, with a portion broken away to show the threaded portion of the linear core.
Figure 11:
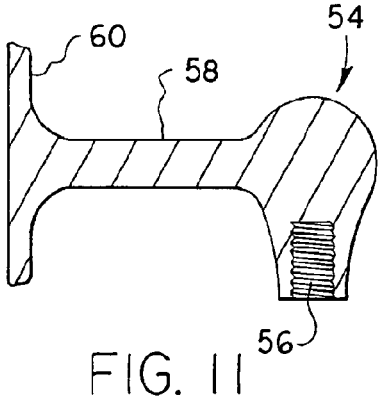
Figure 10:
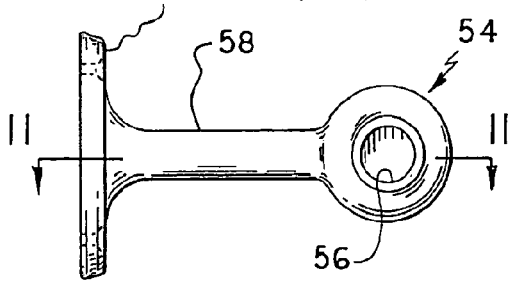
FIG. 10 is a front elevational view of the mounting bracket of the dispenser in FIG. 8 facing the threaded partial throughbore; and, FIG. 11 is a cross section side view of the mounting bracket of the dispenser in FIG. 8 taken generally at line 11-11, as shown in FIG. 10.

FIG. 9, 10 and 11 provide an enlarged view of mounting bracket 54 of an alternative embodiment of dispenser 10. FIG. 9 and 11 show threaded partial throughbore 56 of mounting bracket 54, which is the attachment point for spindle 12. FIG. 11 shows a cross section taken generally at line 11-11, as shown in FIG. 10, showing an empty partial throughbore 56. FIG. 9 shows a partial broken away view of partial throughbore 56 with threaded portion 42 of linear core 32 fully screwed into 56. Spindle 12 can be removed from mounting bracket 54 by simply unthreading it from mounting bracket 54. Providing a threaded junction 22, where spindle 12 is removably threaded into 56, enables a user to detach spindle 12 from mounting bracket base 60, which facilitates easier mounting of dispenser 10 to a vertical surface such as a wall, or a horizontal surface such as a counter top. The threaded connection between spindle 12 and mounting bracket base 60 also gives a user the option of using that detachable connection as the mode of replenishing materials that have been depleted on dispenser 10.

FIG. 10 demonstrates the desirability of stanchion 58 being a sufficient length to ensure that product rolls loaded on dispenser 10 have sufficient clearance to rotate. Depending on the application and product loaded onto dispenser 10 that distance can be inches or more than a foot. It is advantageous that in the primary application, wherein paper towel rolls will be loaded on dispenser 10, the length of stanchion 58 needs to be several inches. Generally, stanchion 58 is slightly larger than the diameter of the product loaded on dispenser 10 to provide adequate clearance for rotation of the roll.

In the embodiments shown in FIGS. 1-11, rolled materials are loaded onto spindle 12 and product is unraveled from dispenser 10 by unwinding the product in the reverse direction that it has been wound. Spindle 12 and fins 18 remain stationary, except for minor flexing of fins 18. Since the spindles are operatively arranged to frictionally engage the interior of rolled materials loaded onto dispenser 10, the most viable alternative for dispensing product from dispenser 10 is by unraveling. This is particularly applicable with products that are perforated at predetermined sheet locations, such as paper towel or toilet tissue rolls. However, for certain products that are a continuous roll, such as plastic wrap or aluminum foil, product can be pulled of off dispenser 10 while fins 18 impede rotation of the product roll. A separate cutting means can be used to remove the desired sheet length, or the friction of fins 18 on the interior of the product roll can be used to stabilize the rotation of the roll as a sheet of product is torn free. Pulling product off of dispenser 10 in this manner is a viable dispensing method for perforated sheets as well, but if multiple sheets are needed it is best to unravel.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. A rolled product dispenser comprising:
a rigid linear core;
a spindle fixedly attached to the exterior of said rigid linear core with at least one fin fixedly attached to said spindle;
a head removably attached to said rigid linear core; and
a base removably attached to said rigid linear core distal to said head.

2. The rolled product dispenser of claim 1, wherein said fins are constructed of an elastomeric material.

3. The rolled product dispenser of claim 1, wherein said spindle has at least two fins disposed diametrically opposed to each other on said spindle.

4. The rolled product dispenser of claim 1, wherein said at least one fin is attached parallel to said spindle and extends radially, outwardly from said spindle.

5. The rolled product dispenser of claim 1, wherein said at least one fin is rigid at its base with increasing flexibility as said fin extends radially outwardly from said spindle.

6. The rolled product dispenser of claim 1, wherein said at least one fin is operatively arranged to constantly engage the interior of a rolled product tube when it is placed upon said spindle.

7. The rolled product dispenser of claim 1, wherein said at least one fin is operatively arranged to impede the rotation of a rolled product tube when sheets of material are torn free.

8. The rolled product dispenser of claim 1, wherein said base has a weighted portion.

9. The rolled product dispenser of claim 8, wherein said base has a cover portion that is placed over said weighted portion.

10. The rolled product dispenser of claim 1, wherein said rigid linear core has a threaded partial throughbore on one end and a threaded portion on an opposite end.

11. The rolled product dispenser of claim 10, wherein said base is attached to said rigid linear core by threading.

12. The rolled product dispenser of claim 1, wherein said rigid linear core extends from the center of said base.

13. The rolled product dispenser of claim 10, wherein a flexible pad is attached to said base.

14. The rolled product dispenser of claim 1, wherein said head is greater in diameter than the interior diameter of a rolled product tube.

15. A rolled product dispenser comprising:
a rigid linear core;
a spindle fixedly attached to the exterior of said rigid linear core with at least one fin fixedly attached to said spindle;
a head removably attached to said rigid linear core; and
a mounting bracket attached to said rigid linear core.

16. The rolled product dispenser of claim 15, wherein said fins are constructed of an elastomeric material.

17. The rolled product dispenser of claim 15, wherein said at least one fin is operatively arranged to impede the rotation of a rolled product tube when sheets of material are torn free.

18. The rolled product dispenser of claim 15, wherein said spindle has at least two fins disposed diametrically to each other on said spindle.

19. The rolled product dispenser of claim 15, wherein said mounting bracket is arranged to be attached to a flat surface.

20. The rolled product dispenser of claim 15, wherein said mounting bracket is L-shaped.

21. A rolled product dispenser comprising:

a rigid linear core;

a spindle fixedly attached to the exterior of said rigid linear core with at least one fin fixedly attached to said spindle;

a head removably attached to said rigid linear core; and a base removably attached to said rigid linear core distal to said head, wherein said at least one fin is rigid at its base with increasing flexibility as said fin extends radially outwardly from said spindle.

22. A rolled product dispenser comprising:

a rigid linear core;

a spindle fixedly attached to the exterior of said rigid linear core with at least one fin fixedly attached to said spindle;

a head removably attached to said rigid linear core; and a mounting bracket attached to said rigid linear core, wherein said at least one fin is rigid at its base with increasing flexibility as said fin extends radially outwardly from said spindle.

23. A rolled product dispenser comprising:

a rigid linear core;

a spindle fixedly attached to the exterior of said rigid linear core with at least one fin fixedly attached to said spindle;

a head removably attached to said rigid linear core; and a base removably attached to said rigid linear core distal to said head, wherein said at least one fin extends generally between the head and the base and tapers radially inwardly proximate the head.

24. A rolled product dispenser comprising:

a rigid linear core;

a spindle fixedly attached to the exterior of said rigid linear core with at least one fin fixedly attached to said spindle;

a head removably attached to said rigid linear core; and a mounting bracket attached to said rigid linear core, wherein said at least one fin extends generally between the head and the [base] *mounting bracket* and tapers radially inwardly proximate the head.

*25. The rolled product dispenser of claim 1 wherein said at least one fin is integral to said spindle.*

*26. The rolled product dispenser of claim 15 wherein said at least one fin is integral to said spindle.*

*27. The rolled product dispenser of claim 21 wherein said at least one fin is integral to said spindle.*

*28. The rolled product dispenser of claim 22 wherein said at least one fin is integral to said spindle.*

*29. The rolled product dispenser of claim 23 wherein said at least one fin is integral to said spindle.*

*30. The rolled product dispenser of claim 24 wherein said at least one fin is integral to said spindle.*

*31. A rolled product dispenser comprising:*

*a rigid linear core;*

*a spindle fixedly attached to the exterior of said rigid linear core, said spindle comprising at least one fin;*

*a head removably attached to said rigid linear core; and*

*a base removably attached to said rigid linear core distal to said head.*

*32. A rolled product dispenser comprising:*

*a rigid linear core;*

*a spindle fixedly attached to the exterior of said rigid linear core, said spindle comprising at least one fin;*

*a head removably attached to said rigid linear core; and*

*a mounting bracket attached to said rigid linear core.*

*33. A rolled product dispenser comprising:*

*a rigid linear core;*

*a spindle fixedly attached to the exterior of said rigid linear core, said spindle comprising at least one fin;*

*a head removably attached to said rigid linear core; and*

*a base removably attached to said rigid linear core distal to said head, wherein said at least one fin is rigid at its base with increasing flexibility as said fin extends radially outwardly from said spindle.*

*34. A rolled product dispenser comprising:*

*a rigid linear core;*

*a spindle fixedly attached to the exterior of said rigid linear core, said spindle comprising at least one fin;*

*a head removably attached to said rigid linear core; and*

*a mounting bracket attached to said rigid linear core, wherein said at least one fin is rigid at its base with increasing flexibility as said fin extends radially outwardly from said spindle.*

*35. A rolled product dispenser comprising:*

*a rigid linear core;*

*a spindle fixedly attached to the exterior of said rigid linear core, said spindle comprising at least one fin;*

*a head removably attached to said rigid linear core; and*

*a base removably attached to said rigid linear core distal to said head, wherein said at least one fin extends generally between the head and the base and tapers radially inwardly proximate the head.*

*36. A rolled product dispenser comprising:*

*a rigid linear core;*

*a spindle fixedly attached to the exterior of said rigid linear core, said spindle comprising at least one fin;*

*a head removably attached to said rigid linear core; and*

*a mounting bracket attached to said rigid linear core, wherein said at least one fin extends generally between the head and the mounting bracket and tapers radially inwardly proximate the head.*

* * * * *